US005192958A

United States Patent [19]

Charnitski

[11] Patent Number: 5,192,958

[45] Date of Patent: Mar. 9, 1993

[54] METHOD AND APPARATUS TO CONTROL OVERALL WRITE LENGTH IN LED PRINT BARS

[75] Inventor: George A. Charnitski, Fairport, N.Y.

[73] Assignee: Xerox Corporation, Stamford, Conn.

[21] Appl. No.: 773,793

[22] Filed: Oct. 9, 1991

[51] Int. Cl.[5] .................. G01D 9/42

[52] U.S. Cl. .................. 346/107 R; 165/100; 346/157; 355/219; 355/326; 361/382; 361/388

[58] Field of Search .................. 346/107 R, 157; 355/219, 232, 326, 327; 361/382, 384, 385, 386, 387, 388; 165/80.4, 80.5, 100, 101

[56] References Cited

U.S. PATENT DOCUMENTS 4,601,328 7/1986 Tasaka et al. .................. 165/12
4,611,901 9/1986 Kohyama et al. .................. 355/326 X
4,865,123 9/1989 Kawashima et al. .................. 165/104.33
4,896,168 1/1990 Newman et al. .................. 346/107 R
5,121,146 6/1992 Smith et al. .................. 346/107 R X

FOREIGN PATENT DOCUMENTS 0086553 4/1991 Japan .

*Primary Examiner*—A. T. Grimley
*Assistant Examiner*—J. E. Barlow, Jr.

[57] ABSTRACT

Overall length of LED print bars arranged in a single pass printing system is controlled by controlling the operating temperature of the LED arrays forming the light emitting portion of the print bar. Rather than trying to maintain the arrays at some predetermined temperature, the array temperatures are allowed to vary over a predetermined range but within this range, the arrays are all at the same temperature. This is accomplished by mounting the arrays on a common subframe which is adapted to circulate a cooling medium through each of the arrays in parallel rather than in series. Thus, each array is cooled at the same rate and will attain the same equilibrium temperature, thus ensuring that registration will be accomplished within each single pass operation.

5 Claims, 2 Drawing Sheets

METHOD AND APPARATUS TO CONTROL OVERALL WRITE LENGTH IN LED PRINT BARS

BACKGROUND AND MATERIAL DISCLOSURE STATEMENT

The present invention is related to printing systems incorporating light emitting print bars as the imager, and more particularly, to a print system using LED print bars which are compensated for changes in length due to temperature variations.

Image print bars used in xerographic recording systems are well known in the art. The print bar generally includes a linear array of a plurality of discrete light emitting sources optically coupled to a linear lens array. Light emitting diode (LED) arrays are preferred for many recording applications. In order to achieve high resolution, a large number of light emitting diodes, or pixels, are arranged in a linear array and means are included for providing a relative movement between the linear array and the photoreceptor so as to produce a scanning movement of the linear array over the surface of the photoreceptor. Thus, the photoreceptor may be exposed to provide a desired image one line at a time as the LED array and associated lens array is advanced relative to the photoreceptor either continuously or in stepping motion. Each LED pixel in the linear array is used to expose a corresponding area on the photoreceptor to a value determined by image defining video data information.

In a color xerographic system, a plurality of LED print bars may be positioned adjacent the photoreceptor surface and selectively energized to create successive image exposures, one for each of the three basic colors. A fourth print bar may be added if black images are to be created as well.

FIG. 1 shows a prior art single pass color configuration having three print bars, 10, 12, 14, each bar including an LED array 10A, 12A, 14A. The arrays are addressed by video image signals whose application is controlled by control circuit 15. Each array is optically coupled to focus the emitter outputs to form three spaced latent images $l_1$, $l_2$, $l_3$ on the surface of photoreceptor belt 16, each image comprising a start of scan line 24. Additional images up to $I_n$ could be formed. The optical coupling is accomplished by a plurality of gradient index lens arrays 10B, 12B, 14B, the lens array sold under the name SELFOC TM a trademark of Nippon Sheet Glass Co., Ltd. Upstream of each exposure station, a charge device 18, 20, 22 places a predetermined charge on the surface of belt 16. Downstream from each exposure station, a development system 26, 28, 30, develops a latent image of the last exposure without disturbing previously developed images.

With such a system as that disclosed in FIG. 1, each colored image must be precisely aligned such that all corresponding pixels in the image areas are registered. The print bar alignment requirements are that pixels of each bar be aligned in the scan or Y-direction of FIG. 1 so that each active write length is equal. The print bar must also be aligned in the skew or X-direction. This alignment must be maintained through continuous revolutions (passes) of the photoreceptor.

To maintain exact color registration of each image, typically to a tolerance of $\pm 0.1\mu$, the overall length of the write area, the pixel to pixel placement, and the straightness of the image line must all be within the required exacting tolerance. One of the most difficult manufacturing tolerances to achieve is the overall or active write length of an image print bar. For example, for a 14.33" LED print bar with 300 spi resolution, 4300 pixels are aligned in the active write area and a $\pm 15\mu$ tolerance in write length is typical.

A specific problem in correcting exact image-to-image registration, and which is addressed by the present invention, is the change in length an LED array undergoes when subjected to temperature increases, which are caused either by heat generated internally to the array, or by heat absorbed by the array from surrounding machine environment.

Typically, accurate LED arrays are made on a single ceramic substrate with a CET (coefficient of thermal expansion) on the order of $7.6 \times 10^{-6}$ linear units/°C. To achieve proper registration (for a $10\mu$ tolerance due to thermal effects) of all pixels over a 364 mm write zone (B4 paper size), the temperature of all multiple print bar imagers would have to be held to $\pm 2°$ C.

According to the principles of the present invention, the temperature of all LED arrays used in the print bar is allowed to vary over a larger temperature range and still have acceptable registration. The technique described is not to keep all arrays at a "constant" temperature but to keep them all at the "same" temperature. This way, the overall write length of the arrays will increase or decrease at the same time and at the same rate, thus achieving individual registration at every pixel. More particularly, the present invention relates to an image printer for forming images at a photosensitive surface moving in a process direction comprising:

a plurality of image print bars aligned parallel to each other and perpendicular to the process direction, each print bar including at least an LED linear array, a manifold subframe adapted to securely mount said print bars in said parallel and perpendicular alignment, said subframe having apertures therethrough for circulating a cooling medium through said subframe and through the interior of said arrays, said circulating media maintaining said arrays and said subframe at the same temperature.

The following references have been identified in a prior art search:

U.S. Pat. No. 4,865,123 to Kawashima et al. discloses an apparatus for circulating a cooling fluid through a plurality of cooling modules for cooling electronic components. The apparatus includes a plurality of supply lines arranged independently and in parallel to each other. Each of the supply lines supplies coolant to an individual cooling module. At one end, the supply lines draw coolant from a mixing tank having a relatively large volume, and at the opposite end, the supply lines return the coolant to the mixing tank, wherein the coolant is circulated so that its temperature is kept uniform throughout. Each supply line includes a pair of pumps 3, check valves 4, and a heat exchanger 5.

U.S. Pat. No. 4,601,328 to Tasaka et al. discloses a method for temperature balancing control of a plurality of heat exchangers used in parallel. The temperatures of a medium flowing through the parallel heat exchangers are sensed at the same position in each of the plurality of heat exchangers, and the sensed temperature values are respectively compared with a temperature setting value, so as to calculate control signals for balancing the temperatures of the medium flowing out of the heat exchangers. Regulation means for each of the respective heat exchangers are responsive to the control signals to effect temperature balance of the medium.

DESCRIPTION OF THE INVENTION

Figure 1:
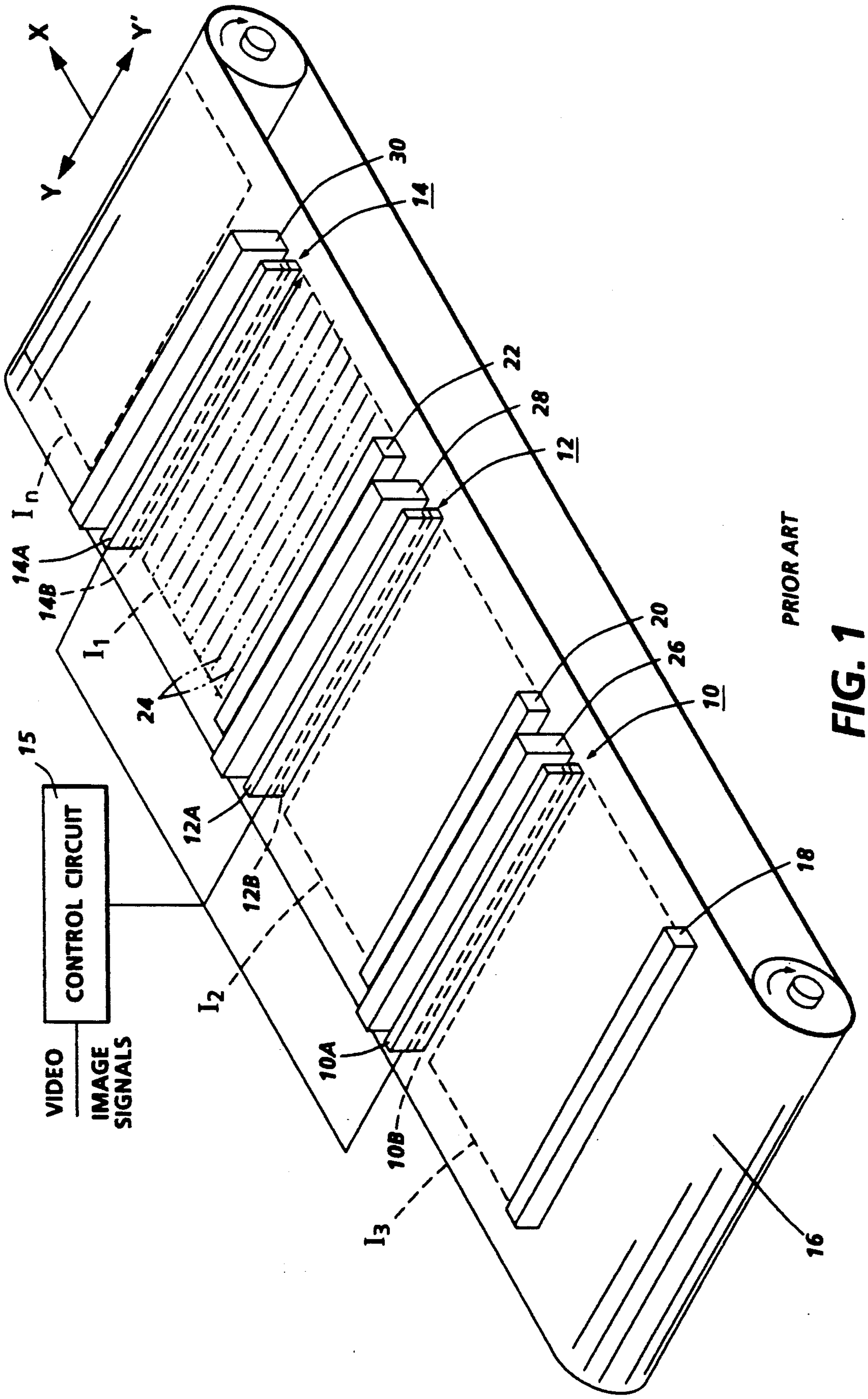
PRIOR ART FIG. 1
FIG. 1 shows a top perspective view of a prior art multi-print bar imaging system.

Referring again to FIG. 1, LED print bars 10, 12, 14 have a resolution of 300 spots per inch (300 spi), and a pixel size of 50×50 microns on 84.67 micron centers. In an application, where an 8.5 inch wide informational line (active write length) is to be exposed, a linear LED array of approximately 2550 pixels, arrayed in a single row, would be required.

Figure 2:
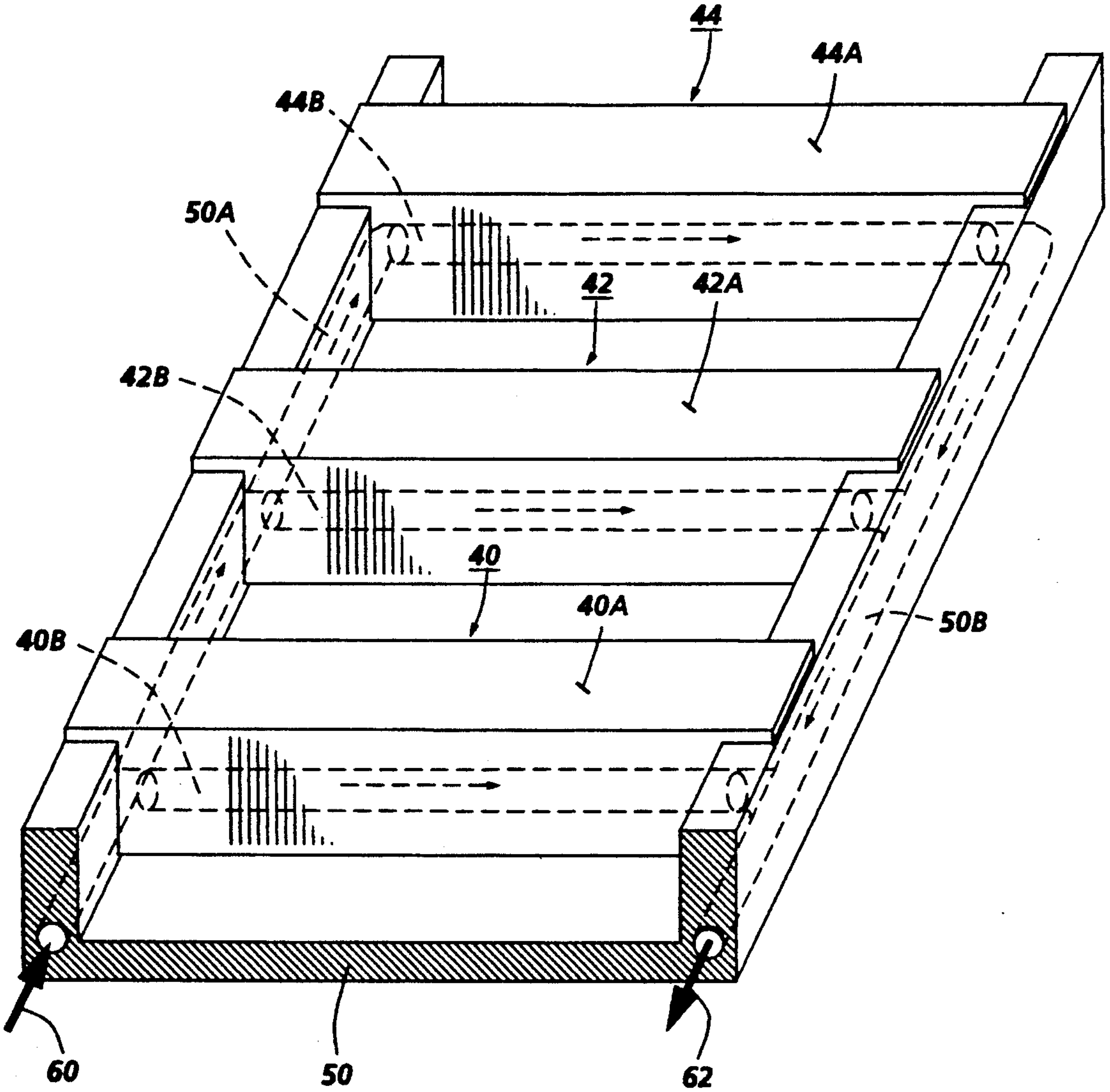
FIG. 2 shows a top perpendicular view of a modified frame assembly for maintaining the LED arrays of said print bar in parallel alignment for circulating a cooling medium through the LED array and through the frame assembly.

It is assumed that the print bars will be operated in an environment where temperature increases will be experienced that would change (increase) the active write length of one or more of the LED arrays 10A, 12A, 14A. According to the present invention, and referring to FIG. 2, LED arrays 40A, 42A, 44A of print bars 40, 42, 44, are shown mounted to a common sub frame assembly 50. Linear lens arrays are not shown but would be aligned in an optically coupled relationship between the LED arrays and the photoreceptor. Frame assembly 50, in a preferred embodiment, is a manifold having interior side chambers 50A, 50B, which communicate with interior channels 40B, 42B, 44B, within each array 40A, 42A, 44A, respectively. A cooling media is introduced to frame 50 at entrance opening 60 and circulates through each array via channels 10C, 12C, 14C. The media circulates through the arrays and returns to frame channel 50B and out of exit 62. The media circulates into each array in parallel fashion, producing identical amounts of cooling to each array, as it passes therethrough. When an equilibrium temperature is obtained, the array and the subframe will all be at the same temperature. This temperature may vary within some predetermined temperature range, e.g. 18° C. to 40° C. Thus the overall active write length may increase or decrease if the temperature rises or falls, respectively, but the write length variations will take place at the same time and at the same rate; hence, image-to-image registration within a single pass cycle will remain constant.

If an upper limit to the print bar operating temperature is required, a thermostat may be inserted into the system which will be activated at that temperature. The output of the thermostat will be used to operate a heat exchanger to provide further cooling of the print bars' temperatures.

While the invention has been described with reference to the structures disclosed, it is not confined to the details set forth but is intended to cover such modifications or changes as they come within the scope of the following claims.

What is claimed is:

1. An image printer for forming images at a photosensitive surface, moving in a process direction comprising:

a plurality of image print bars aligned parallel to each other and perpendicular to the process direction, each print bar including at least an LED array, a manifold subframe adapted to securely mount said arrays in said parallel and perpendicular alignment, said subframe having apertures therethrough for circulating a cooling medium through said subframe and through the interior of said arrays, said circulating media maintaining said arrays and said subframe at the same temperature.

2. A method for controlling overall length of LED arrays by maintaining the arrays at the same temperature within a preselected range including the steps of:

mounting the arrays on a common subframe, supplying a cooling medium to the arrays along parallel paths to operate the arrays at the same temperature, and supplying the cooling medium to the subframe so as to maintain the subframe at the same temperature as the arrays, whereby the overall write length of the arrays will increase or decrease at the same time and at the same rate.

3. In a printer system, a line by line exposure apparatus for creating line images on a photoreceptor member moving in a process direction comprising:

a plurality of image print bars each bar including a linear array of a plurality of light emitting diodes (LEDs), a linear lens array for focusing light from said emitting diodes onto said photosensitive member, and means for maintaining said print bars at the same temperature during operation, said temperature having different values during said operation.

4. A method for compensating for physical changes in LED print bars used to form images on a photosensitive medium comprising the steps of:

mounting the print bars in operative position within a subframe module, the subframe module mounted so as to bring the print bar into a writing relationship with said medium, and circulating a cooling medium within said subframe module and within the interior of said print bars so as to maintain the print bars and the subframe module at the same equilibrium temperature.

5. In a color imaging recording apparatus for superimposing a plurality of images of different colors on one another to form a composite color image on a moving photoreceptor belt, said color image apparatus comprising:

a plurality of print bars arranged adjacent to the photoreceptor belt surface, each print bar adapted to create an exposure pattern along an active write length, corresponding with one of said plurality of color images, each said print bar having a plurality of LED arrays which are selectively energized to form the exposure pattern, a plurality of gradient index lens arrays, each lens array associated with one of said LED arrays to transmit outputs of said arrays to form said exposure pattern, and means for compensating for temperature-induced variations in the active write length of each LED array so as to maintain precise registration of said color images, said means comprising means for circulating a cooling medium through each LED array along parallel paths, so as to maintain each LED array at the same temperature.

* * * * *

UNITED STATES PATENT AND TRADEMARK OFFICE

CERTIFICATE OF CORRECTION

PATENT NO. : 5,192,958

DATED : March 9, 1993

INVENTOR(S) : CHARNITSKI

It is certified that error appears in the above-indentified patent and that said Letters Patent is hereby corrected as shown below:

Column 4, line 9, change "media" to --medium;

line 30, change "photosensitive" to --photoreceptor--; and line 48, change "image" to --imaging--.

Signed and Sealed this

Sixteenth Day of July, 1996

Attest:

BRUCE LEHMAN

*Attesting Officer*

*Commissioner of Patents and Trademarks*